Sept. 8, 1964     M. A. EGGENBERGER     3,147,821
EMERGENCY BEARING OIL SUPPLY FOR A DECELERATING SHAFT
Filed Nov. 20, 1962                    2 Sheets-Sheet 1
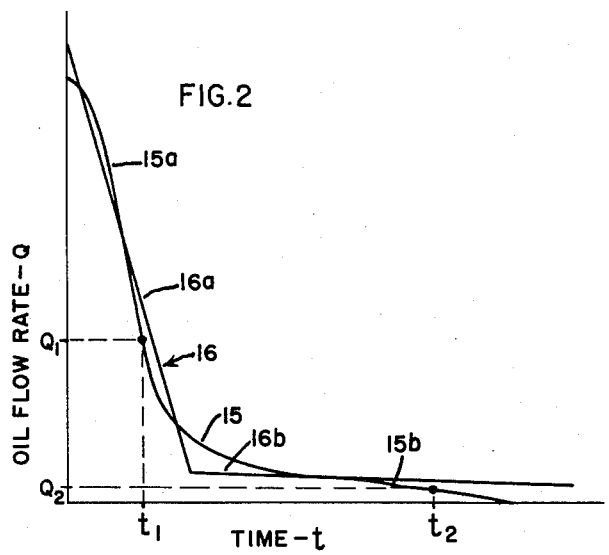
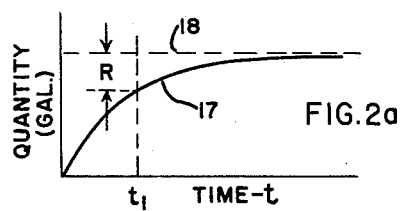
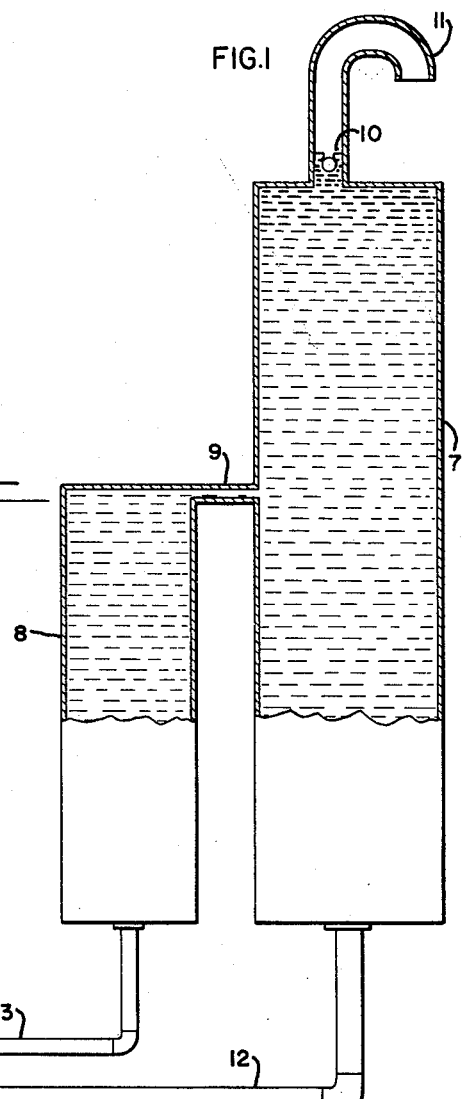
INVENTOR:
MARKUS A. EGGENBERGER,
BY  W. C. Crutcher
HIS ATTORNEY.

Sept. 8, 1964  M. A. EGGENBERGER  3,147,821
EMERGENCY BEARING OIL SUPPLY FOR A DECELERATING SHAFT
Filed Nov. 20, 1962
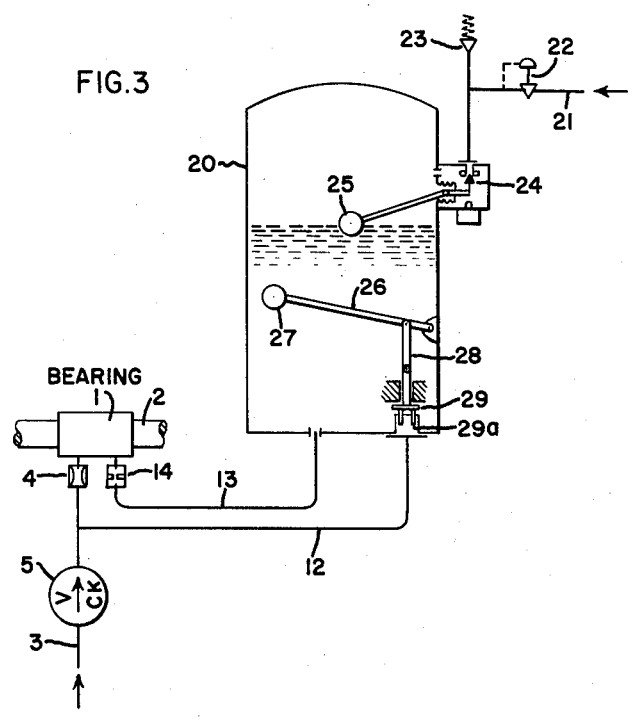
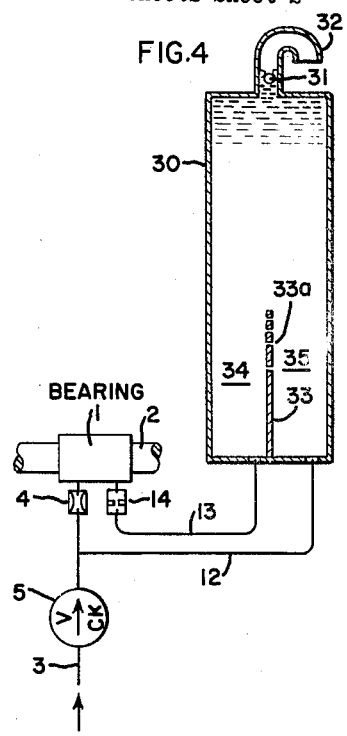
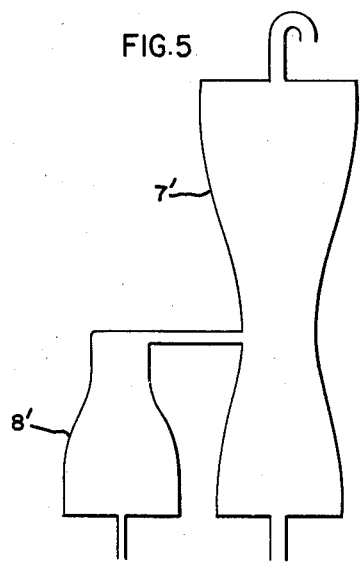
INVENTOR:
MARKUS A. EGGENBERGER,
BY *W. C. Crutcher*
HIS ATTORNEY.

United States Patent Office 3,147,821
Patented Sept. 8, 1964

3,147,821
EMERGENCY BEARING OIL SUPPLY FOR A
DECELERATING SHAFT
Markus A. Eggenberger, Schenectady, N.Y., assignor to
General Electric Company, a corporation of New York
Filed Nov. 20, 1962, Ser. No. 238,907
10 Claims. (Cl. 184—1)

This invention relates to an emergency oil supply for one or more bearings for a rotating shaft, and more particularly to a system for supplying emergency oil to the bearings when the normal bearing oil supply is interrupted while the shaft is decelerating.

Although highly reliable bearing lubrication arrangements have been designed for large rotating machinery, such as turbine generators, occasionally the normal lubricating systems have been known to fail with great damage resulting to these machines. Such failures are often occasioned during emergency periods when the machines are shut down for some reason entirely unrelated to the lubricating system. Side effects, such as loss of auxiliary power, or human error during such emergencies have resulted in interruptions to the normal oil supply before the shafts have decelerated to a complete stop. Failure of the oil supply causes the bearing to heat up quite rapidly, and since such bearing metals have low melting temperatures, great damage can be done to the bearings. It is therefore desirable to have a means of supplying emergency oil to the bearings while the shaft decelerates in the event the normal oil supply is interrupted.

Previous suggestions for supplying emergency oil on loss of bearing oil pressure in a steam turbine have included overhead gravity tanks to supply oil at the normal flow rate, such as may be seen in U.S. Patent 2,497,695 issued to R. Sheppard on Feb. 14, 1950, and assigned to the assignee of the present application, or gear pumps which supply oil at a flow rate proportional to the speed of the decelerating shaft. The quantity of oil required in a gravity supply tank, calculated according to normal bearing oil flow rates, is very large. Comparable extra tank capacity must be provided below floor level of the turbine room to receive the oil from the gravity tank. The required size of an emergency gravity feed tank has caused the gear pump approach to be favored, although it is less reliable.

Accordingly, one object of the present invention is to provide a reliable and inexpensive emergency oil supply for a decelerating shaft when the normal oil supply is interrupted.

Another object of the invention is to provide an emergency oil system using one or more tanks of the very minimum size necessary, in order to protect the bearings during deceleration of a shaft or rotor, for instance, a steam turbine or generator rotor.

Still another object of the invention is to provide an emergency oil supply method for a decelerating rotor which is reliable, and yet which uses a minimum quantity of oil necessary to safely protect the bearings.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a schematic elevation view of a preferred embodiment of the emergency oil system, FIG. 2 is a graph of emergency oil flow rate versus deceleration time, FIG. 2a is a graph of total quantity of emergency oil versus deceleration time, FIG. 3 is a schematic elevation view of a modified form of the invention, FIG. 4 is a schematic elevation view illustrating still another modification of the invention, and FIG. 5 is an outline drawing illustrating tank shapes for obtaining a more precisely regulated oil flow than provided by the preferred simpler embodiment of FIG. 1.

Briefly stated, the invention is practiced by obtaining, by calculation or experiment, a curve of oil flow versus time for a shaft decelerating in a known pattern of speed vs. time which provides substantially constant bearing temperature during the deceleration. The minimum required oil quantity is calculated by integrating this curve with respect to time. This minimum quantity is contained in a tank or tanks together with means to regulate the supply of emergency oil to the bearing during deceleration of the shaft in a known pattern of oil flow vs. time, so as to provide the required instantaneous oil flow such that the bearing metal temperature will be held close to a safe limit without exceeding it.

Referring now to FIGURE 1 of the drawing, a bearing 1 supports a shaft 2. Bearing 1 may of course be considered representative of any number of journal or thrust bearings servicing a particular rotor shaft 2. Bearing 1 is supplied through pipe 3 from a normal source of oil under pressure (not shown). The source of normal oil pressure may be any one of the known oil supply systems suitable for large rotating machinery, such as a centrifugal pump driven from the rotating shaft. A relatively large orifice 4, regulates the supply of oil from pipe 3, to bearing 1. A check valve 5, prevents the backward flow of oil toward the normal supply source if normal oil pressure fails.

Failure of pressure, indicating an inadequacy of a normal supply to properly lubricate the bearing is detected by a low pressure oil trip 6. Device 6 may for instance be a pressure-responsive transducer capable of emitting hydraulic, electrical, or pneumatic signals when the oil pressure in pipe 3 falls below a predetermined safe minimum. The details of oil pressure trip 6 are not shown because they are not material to the present invention. It is normal practice, in turbine-generators, for example, to use such protective devices as the oil pressure trip 6 to emit signals 6a, 6b, to the condenser vacuum breaker and to the emergency governor trip system respectively. The condenser vacuum breaker, which is normal equipment in a steam turbine generator, admits air to the condenser and has a tendency to decelerate the turbine at a greater rate. The emergency trip system closes the turbine steam inlet valves and disconnects the generator from the line. After actuation of these devices, the rotor will decelerate according to a readily ascertainable schedule of speed vs. time.

The emergency oil supply for the bearing is contained in a pair of gravity supply tanks 7, 8, connected at the top of tank 8 by a crossover pipe 9. Tanks 7 and 8 are relatively tall in relation to their diameter and are located at a sufficient altitude above bearing 1 to provide the proper pressure head, and tank 7 has greater capacity and is substantially higher than tank 8. Tank 7 has a float-type check valve 10 at the top leading to the vent pipe 11. The tanks are both filled through supply pipes 3, 12, 9 until check valve 10 prevents further filling. The valve 10 then opens automatically to allow oil to flow freely from the bottom of the tanks, whenever the supply of oil through conduit 3 ceases.

An opening in the bottom of tank 7 is connected to pipe 3, between orifice 4 and check valve 5, by means of a large emergency oil supply pipe 12. An opening in the bottom of tank 8 is connected by means of a second smaller emergency oil supply pipe 13 through an orifice 14 to bearing 1. This orifice has a much smaller flow area than orifice 4. As an indication of the comparative sizes of orifices 4, 14, orifice 4 may have on the order of 95% of the total flow area of the two orifices together, while orifice 14 may have only on the order of 5% of the total flow area. In other words, orifice 4 may have a flow area on the order of 20 times that of orifice 14.

It has been discovered that the flow of oil necessary to prevent the bearing of a decelerating turbine shaft from overheating is much less than previously thought necessary, and decreases sharply as the shaft decelerates. Tests indicate that on a shaft decelerating according to a known pattern, i.e., having a known speed at any given time during the deceleration process, the proper oil flow rate for a given shaft speed (hence at a particular time), can be readily determined to give a certain safe bearing temperature. If the shaft decelerates according to a known schedule, a curve can be obtained which gives the required safe oil flow rate at any time during deceleration to hold the bearing temperature substantially constant. The constant temperature selected will of course be one which holds the bearing metal at a preselected safe temperature.

FIGURE 2 illustrates such an experimentally derived curve 15, which is the "constant bearing temperature curve" for the shaft and bearing of FIG. 1. In other words, the bearing temperature at time $t_1$ with a rate of oil flow $Q_1$, is the same as the bearing temperature at time $t_2$, with a rate of oil flow $Q_2$. It will be observed that curve 15 has the characteristic that, over a first portion 15a the constant temperature flow rate decreases very rapidly with respect to time, while over a second portion 15b, the flow rate is comparatively lower and decreases very slowly with respect to time.

In accordance with the invention, the shape, size, and arrangement of tanks 7, 8, together with orifices 4, 14, is such as to give a close approximation to the constant bearing temperature curve 15. This approximating curve, shown in FIG. 2, is designated generally as 16, and includes a first linear portion 16a of rapidly decreasing oil flow and a second linear portion 16b, of almost constant but very slowly decreasing oil flow. The portion 16a corresponds to the time and flow rate of oil from tank 7 through the large orifice 4, the contribution of tank 8 through orifice 14 during this time being relatively negligible. Portion 16b of the graph indicates the very slow flow rate obtained from the smaller tank 8, through the small orifice 14, after tank 7 is emptied.

The carefully determined relative sizes of tanks 7, 8, corresponding to the minimum total quantity of oil required to hold the bearing at constant temperature during deceleration, are found by integrating curve 15 (or curve 16) with respect to time. The result is illustrated in FIG. 2a where curve 17, representing total flow required as a function of time in the deceleration process, is seen to approach a limiting ordinate 18 in terms of total gallons of oil required. Thus, the minimum aggregate size of tanks 7, 8, can be ascertained for a given maximum safe bearing temperature. The relative diameter of the tanks at a particular height on the tank is determined so that the remaining oil quantity (R in FIG. 2a) at any time $t_1$ is stored in the tanks at a depth which produces a static head on the orifices 4 and 14 which causes the appropriate oil flow ($Q_1$ in FIG. 2) at that particular time ($t_1$) through the orifices.

The operation of the embodiment of FIGURE 1 will be seen from the following. The normal oil supply pressure will cause tanks 7, 8 to fill through conduits 12, 9 from supply pipe 3. Subsequent failure of the normal oil supply through pipe 3 will actuate the low oil pressure trip 6 which, in turn, actuates the emergency trip system and the vacuum trip (not shown). It will be understood that these devices are indicated because of the effect which they have in causing the rotor to decelerate according to the previously ascertained schedule.

When the pressure in pipe 3 drops below the value at which device 6 is tripped, the supply pressure no longer tends to hold the oil elevated in tanks 7, 8, whereupon the static head from these tanks closes check valve 5, and check valve 10 opens. Oil now flows by gravity from tank 7 at a very high but rapidly decreasing rate (line 16a in FIG. 2) through orifice 4, during the initial coasting period of the rotor. While and after tank 7 empties, oil flows at a much lower and more slowly decreasing rate from tank 8 through orifice 14. Its effect is only evident, however, during the latter portion of the coasting period (line 16b of FIG. 2). The composite curve 16 representing the combined flow through orifices 4, 14, approximates the constant bearing temperature curve 15, hence a minimum quantity of oil is used to hold the bearing temperature substantially constant as the rotor decelerates according to the known schedule of rotor speed versus time.

A modified form of the invention is seen in FIGURE 3, wherein the bearing, shaft, orifices, check valve, and pipes supplying the orifices have the same reference numerals as previously. The details concerning the low oil pressure trip 6 are omitted. Instead of using two separate tanks, however, pipes 12, 13, are connected to openings in the bottom of a large accumulator tank 20. Means are provided to maintain an inert gas, such as carbon dioxide or nitrogen, under pressure in the top of tank 20. Hence the accumulator tank need not be as tall as the previously described gravity feed tanks to provide an adequate pressure head. The gas supply includes a source of gas under pressure (not shown), a gas supply pipe 21, a reducing valve 22, a safety valve 23, and an inlet valve 24 operated by a float 25, in a manner which will be obvious from the drawing. When the liquid level drops, the supply of pressurizing gas is shut off by valve 24 to prevent its loss when the tank is emptied of liquid.

Inside tank 20 is a pivoted lever, 26, carrying a float 27, arranged to move rod 28 downward when the liquid level drops to that of the float 27. Attached to the lower end of rod 28, is a control valve 29, arranged to reduce the opening to pipe 12 gradually by means of the flow control members 29a. When the level reaches a certain minimum, the large line is entirely shut off and oil keeps flowing into the bearings at a low, slowly reducing rate through the orifice 14. The control valve 29 can be readily designed to provide a somewhat rounded characteristic curve, more closely approaching the theoretically perfect curve 15 of FIG. 2.

FIGURE 4 illustrates another modification of the invention in which, again, like elements are designated with the same reference numerals as in FIGURE 1. Emergency oil supply pipes 12, 13, are connected to spaced openings in the bottom of a single gravity feed tank 30, arranged with a check valve 31 in vent pipe 32, similar to FIG. 1. A vertical baffle 33, divides the lower half of the tank into separate chambers 34, 35. After the liquid level in tank 30 falls to the top of baffle 33, the right-hand chamber 35 will empty quickly through large orifice 4, while the left-hand chamber 34 will thereafter continue to supply oil at a very low rate of flow through the much smaller orifice 14. Hence, this arrangement is substantially equivalent to the two tanks shown in FIG. 1 except that only one vessel is used. A series of small holes 33a can be selectively placed in the baffle 33, non-uniformly spaced, as shown, so as to obtain a closer approximation to the desired curve 15.

FIG. 5 illustrates in outline form, how the changing oil flow rate represented by the curve 15 of FIG. 2 can be obtained exactly by more precisely shaping the tanks 7, 8, of FIGURE 1. These are shown as 7', 8' in FIG. 5. Ordinarily the slight deviations from the theoretically perfect curve 15, which are occasioned by using the simpler tank shapes of FIG. 1, do not warrant the added expense of giving the tanks the complex shapes shown in FIG. 5. Suitable results are obtained if the tanks regulating the supply of oil according to the constant bearing temperature curve 15 substantially approximate that curve. The primary criterion is that the oil flow decreases very rapidly during a preselected initial portion of the deceleration process, and then decreases at a very much lower rate during the succeeding portion of the deceleration process.

The emergency oil supply system shown is extremely reliable and simple. When the turbine starts up, the emergency tanks are automatically filled from the normal oil supply system and are at all times ready to instantly supply emergency oil to the bearings when the normal oil supply is interrupted, without employing complicated regulating valves, which might be subject to failure or malfunction. Moreover, by automatically regulating the oil supply according to a constant bearing temperature curve for a shaft decelerating according to a known schedule, a much smaller gravity feed tank can be employed than previously considered necessary, with substantial resulting economies in cost of equipment and in the total quantity of oil required.

While several possible forms of equipment for practicing the invention have been disclosed, it will be apparent that many other equivalent tank arrangements and automatic control devices may be used to effect the novel lubrication process of the invention, and it is, of course, intended to cover in the appended claims all such additional modifications as fall within the true spirit and scope of the invention.

What I claim as new and desire to secure by Letters Patent of the United States is:

1. The method of lubricating bearing means for a rotor during the deceleration period when the rotor is coasting to rest according to a known schedule of speed decreasing as a function of time from the start of the coasting process, which method includes the steps of:
    supplying lubricant to the bearing means at a high initial rate substantially equal to that required in normal operation and decreasing at a rapid rate during an initial portion of the coasting process in which the lubricant serves both to lubricate and cool the bearing means, and
    supplying lubricant to the bearing means at a substantially lower rate and decreasing at a slower rate during a succeeding portion of the coasting process in which the lubricant performs principally a lubricating function, whereby the temperature of the bearing is maintained below a preselected value throughout a major portion of the deceleration process.

2. The method of lubricating a bearing supporting a rotating shaft during deceleration of the shaft from normal speed upon shutdown of the equipment, which method comprises:
    supplying lubricant to said bearing during the early part of the deceleration process at a rate which decreases with time faster than the speed of the shaft decreases with time, and
    supplying lubricant to said bearing during a succeeding part of the deceleration process at a rate which decreases with time more slowly than the speed of the shaft decreases with time, whereby the bearing temperature is maintained substantially constant during the entire deceleration process with a minimum total quantity of lubricant supplied to the bearing during the deceleration process.

3. An auxiliary lubrication system for a bearing for a rotating shaft which decelerates when coasting to rest according to a known schedule of speed change versus time, comprising:
    normal oil supply means including a normal supply conduit connected to furnish lubricating oil under pressure to the bearing,
    check valve means in said normal supply conduit to prevent backward flow of oil to the normal supply means,
    elevated oil reservoir means for containing a preselected quantity of oil,
    first conduit means connected to supply oil by gravity flow from said elevated reservoir means to the normal oil supply conduit between said check valve means and the bearing,
    second conduit means connected between said reservoir means and the bearing to supply oil thereto by gravity flow, and
    means regulating the respective flow through the first and second conduit means to provide lubricating oil at rates effective to substantially limit the bearing temperature to a predetermined maximum value during at least a major portion of the shaft deceleration process, whereby said oil reservoir means is filled with auxiliary oil from the normal oil supply means during normal operation and causes said check valve to close upon interruption of the supply of oil from said normal supply means and furnishes oil by gravity flow to said bearing at relatively high and rapidly decreasing flow rates during an initial portion of the deceleration process and at relatively low and more slowly decreasing flow rates during a subsequent portion of the deceleration process.

4. An auxiliary lubrication system in accordance with claim 3 in which the elevated oil reservoir means comprises:
    a first tank connected to supply oil at relatively high flow rates to the first conduit means during an initial portion of the deceleration process,
    a second tank connected to supply oil at relatively lower flow rates to the second conduit means during a subsequent portion of the deceleration process, and
    interconnecting conduit means communicating between the top of said second tank and an intermediate portion of said first tank.

5. An auxiliary lubrication system in accordance with claim 3 in which the elevated oil reservoir means comprises:
    a tank having, in the lower portion thereof, vertical baffle means dividing said lower tank portion into two separate chambers connected to supply oil to the first and second conduits respectively,
    said baffle means having spaced ports communicating between said separate chambers at various heights above the bottom of said tank.

6. An auxiliary lubrication system in accordance with claim 3 in which the elevated oil reservoir means comprises:
    at least two tanks with an interconnecting conduit communicating between the top of one tank and an intermediate portion of the other tank,
    at least one side wall of at least one of said tanks being contoured to vary the effective horizontal cross section area of the tank as a function of level of oil in the tank to effect a preselected change of rate of oil delivery from that tank to its connecting conduit as a function of time during the deceleration process.

7. An auxiliary lubrication system in accordance with claim 3 in which the oil reservoir comprises:
    a tank connected to supply oil directly to the bearing at restricted flow rates through the second conduit means throughout the deceleration process, and
    variable area valve means for regulating the rate of discharge of oil from said tank into the first conduit means as a function of level of liquid in the tank during at least a portion of the initial period of supply of oil at relatively high flow rates.

8. An auxiliary lubrication system for a bearing carrying a shaft which decelerates according to a known schedule of speed change versus time comprising:
    first oil supply means connected to furnish liquid lubricant to said bearing during normal operation, auxiliary elevated reservoir means connected to supply a preselected total quantity of oil to the bearing when the normal supply means is interrupted, first and second conduit means connected to supply oil by gravity flow to the bearing from separate portions of said auxiliary reservoir means, and means regulating the flow rates through said respective first and second conduits effective to cause the first conduit initially to supply oil at relatively high rates, and the second conduit to continue to supply oil, after flow through the first conduit has ceased, at lower rates effective to maintain bearing temperature substantially at a preselected value during at least a major portion of the deceleration process.

9. An auxiliary lubrication system for a bearing for a rotatable shaft which decelerates when coasting to rest according to a known schedule of speed change versus time comprising:

gravity flow reservoir means having an upper common chamber portion and separate lower first and second chamber portions, a source of oil under pressure including first conduit means connected to supply oil to the bearing in normal operation, check valve means in the first conduit means preventing backward flow of oil from the bearing toward said source, second conduit means connecting said first lower chamber portion to said first conduit means between the check valve means and the bearing and effective to supply oil to the bearing at relatively high rates during an initial portion of the deceleration process, and third conduit means connecting said second lower chamber portion to the bearing and effective to supply oil at substantially lower flow rates during a subsequent portion of the deceleration process.

10. The combination according to claim 9 in which said second and third conduit means contain first and second orifice means respectively, the effective flow area of said first orifice means being on the order of 20 times that of said second orifice means.

References Cited in the file of this patent

UNITED STATES PATENTS

| | | |
|---|---|---|
| 1,131,011 | Shoemaker et al. | Mar. 9, 1915 |
| 1,370,641 | Grant | Mar. 8, 1921 |
| 2,497,695 | Sheppard | Feb. 14, 1950 |